United States Patent
Gugel et al.

(10) Patent No.: US 10,069,380 B2
(45) Date of Patent: Sep. 4, 2018

(54) ARRANGEMENT FOR THE LIQUID COOLING OF AN ELECTRIC MOTOR GENERATOR UNIT

(71) Applicant: Deere & Company, Moline, IL (US)

(72) Inventors: Rainer Gugel, Planlstadt (DE); Norbert Fritz, Ilvesheim (DE); David Mueller, Stutensee (DE)

(73) Assignee: Deere & Company, Moline, IL (US)

( * ) Notice: Subject to any disclaimer, the term of this patent is extended or adjusted under 35 U.S.C. 154(b) by 142 days.

(21) Appl. No.: 15/057,680

(22) Filed: Mar. 1, 2016

(65) Prior Publication Data

US 2016/0261173 A1 Sep. 8, 2016

(30) Foreign Application Priority Data

Mar. 5, 2015 (DE) .......................... 10 2015 203 974

(51) Int. Cl.
| | |
|---|---|
| *H02K 9/19* | (2006.01) |
| *H02K 11/25* | (2016.01) |
| *H02K 7/102* | (2006.01) |

(52) U.S. Cl.
CPC .............. *H02K 9/19* (2013.01); *H02K 11/25* (2016.01); *H02K 7/102* (2013.01); *H02K 2205/12* (2013.01)

(58) Field of Classification Search
CPC .......... H02K 11/25; H02K 9/19; H02K 7/102; H02K 2205/12
USPC ...................................................... 310/52–64
See application file for complete search history.

(56) References Cited

U.S. PATENT DOCUMENTS

| | | | | |
|---|---|---|---|---|
| 5,449,961 A | * | 9/1995 | Ludwig | ................... F01D 15/10 310/58 |
| 8,063,519 B2 | | 11/2011 | Smith | |
| 8,466,649 B2 | | 6/2013 | Hyde et al. | |
| 2006/0066155 A1 | * | 3/2006 | Matin | .................... H02K 5/136 310/52 |
| 2006/0113851 A1 | * | 6/2006 | Ishihara | ................... H02K 9/20 310/52 |
| 2008/0001486 A1 | * | 1/2008 | Smith | ...................... H02K 9/04 310/52 |
| 2008/0073984 A1 | | 3/2008 | Down et al. | |
| 2009/0224715 A1 | | 9/2009 | Smith | |

(Continued)

FOREIGN PATENT DOCUMENTS

| | | |
|---|---|---|
| DE | 2331493 C3 | 1/1974 |
| EP | 2262081 A1 | 12/2010 |
| EP | 2840690 A1 | 2/2015 |

OTHER PUBLICATIONS

European Search Report issued in counterpart application No. 16158457.8, dated Jun. 27, 2017. (5 pages).

(Continued)

*Primary Examiner* — Naishadh Desai

(57) ABSTRACT

A system is provided for liquid cooling of an electric motor generator unit. The electric motor generator unit includes a magnetic air gap running between a stator and a rotor, wherein for the cooling of the electric motor generator unit, the air gap is acted on with cooling liquid supplied from the outside. A control device adapts the pressure or the volume flow of the supplied cooling liquid as a function of a determined actual value of an operating temperature variable of the electric motor generator unit.

14 Claims, 3 Drawing Sheets

(56) References Cited

U.S. PATENT DOCUMENTS

| | | | |
|---|---|---|---|
| 2011/0285339 A1 | 11/2011 | Hyde et al. | |
| 2012/0205994 A1 | 8/2012 | Deffek et al. | |
| 2013/0049498 A1* | 2/2013 | Boughtwood | B60L 7/006 310/59 |
| 2013/0342044 A1* | 12/2013 | Vallinayagam | H02K 5/20 310/53 |
| 2014/0311704 A1* | 10/2014 | Yokoyama | H02K 9/19 165/41 |
| 2015/0035391 A1 | 2/2015 | Fuchs et al. | |
| 2015/0042184 A1 | 2/2015 | Matsumoto | |

OTHER PUBLICATIONS

German Search report issued in counterpart application No. 102015203974.9 dated Feb. 12, 2016 (10 pages).
European Search Report issued in counterpart application No. 16158457.8, dated Jul. 13, 2016. (7 pages).
European Search Report issued in counterpart application No. 16158457.8 dated Mar. 22, 2018. (5 pages).

* cited by examiner

ARRANGEMENT FOR THE LIQUID COOLING OF AN ELECTRIC MOTOR GENERATOR UNIT

RELATED APPLICATIONS

This application claims priority to German Application Ser. No. DE 102015203974.9, filed on Mar. 5, 2015, which is hereby expressly incorporated by reference in its entirety.

FIELD OF THE DISCLOSURE

The present disclosure relates to a liquid cooling system of an electric motor generator with an electric motor generator unit that has a magnetic air gap running between a stator and a rotor, wherein the air gap can be acted on with cooling liquid supplied from the outside, for the cooling of the motor generator unit.

BACKGROUND

Liquid-cooled electric motor generator units are used in, among other things, the field of commercial agricultural vehicles and are used there to implement infinitely switchable gear assemblies or for the electric supply of additional units of the commercial agricultural vehicle by means of a crankshaft generator or an external auxiliary generator. The motor generator units, designed mostly as synchronous motor generators, have a stator with a stator lamination package in addition to associated stator windings and a permanently magnetized motor that is mounted such that it can rotate within the stator. In order to remove the heat loss from the stator windings and caused during operation, the synchronous motor generator has an inlet which cooling liquid under pressure can be conducted from the outside through a magnetic air gap running between the stator and rotor. The cooling liquid found in the air gap results in the appearance of efficiency-reducing shearing and friction forces between the stator and rotor, wherein they increase with the pressure and volume flow of the supplied cooling liquid. The cooling liquid is a hydraulic or gear oil branched off from a central provisioning system of the commercial agricultural vehicle or the external auxiliary generator whose pressure or volume flow is fixed by the system, so that a suitable compromise can be found between the required cooling performance, on the one hand, and the efficiency of the synchronous motor generator, on the other hand.

SUMMARY

The present disclosure provides an arrangement or system for the liquid cooling of an electric motor generator unit that optimizes the cooling performance-efficiency ratio.

The arrangement or system for the liquid cooling of an electric motor generator unit includes an electric motor generator unit, which has a magnetic air gap running between a stator and a rotor. The air gap for the cooling of the electric motor generator unit can be acted on by cooling liquid supplied from the outside. In accordance with the disclosure, a control device adapts the pressure or volume flow of the supplied cooling liquid as a function of a determined actual value of an operating temperature variable of the electric motor generator unit.

In this way, it is possible to implement a temperature-oriented supply of cooling liquid which thus takes into account the actual cooling need of the electric motor generator unit. The determination of the actual value of the operating temperature variable is carried out, for example, by means of a temperature sensor located in the area of the air gap whose sensor signals are evaluated by the control device. The control device adapts the pressure or the volume flow of the supplied cooling liquid in accordance with the evaluated sensor signals by a suitable control of an electrically operated valve or an electrically operated aperture.

In particular, the cooling liquid may be a commercial hydraulic or gear oil that is used for the lubrication of the motor generator unit and perhaps a gear assembly connected with it. The motor generator unit can be designed hereby as an inner-cooled synchronous motor generator in which the cooling liquid is conducted through a central borehole running in the rotor via radial boreholes into the air gap or in the direction of the winding heads.

The control device adapts the pressure or the volume flow of the supplied cooling liquid in such a way that the determined actual value is adjusted to a theoretical value of the operating temperature variable, which is specified for a motor operation of the motor generation unit. With the corresponding specification of the theoretical value of the operating temperature variable, it is possible during the motor operation of the motor generator unit to ensure that only enough cooling liquid as measured on the actual operating state of the motor generator unit is actually required for the cooling of the stator windings. The quantity of cooling liquid found between the rotor and stator and the efficiency-diminishing shearing and friction forces caused as their result can in such a way be reduced to an absolutely required extent. The adjustment of the actual value to the theoretical value of the operating temperature variable is carried out, in particular, in the sense of a minimizing of a control deviation between the two values, and for this purpose, the control device has an appropriate control circuit.

It is hereby conceivable that, during the motor operation, the control device limits, upward and/or downward, the pressure or the volume flow of the supplied cooling liquid. By the specification of a corresponding lower or upper limiting value, it is possible to maintain not only a sufficient provisioning of the motor generator unit with cooling liquid for the purpose of its lubrication, but also to avoid an undesired flooding of the air gap leading to excessive shearing and friction forces.

Furthermore, there is the possibility that the control device for the limiting of the pressure or volume flow of the supplied cooling liquid specifies a lower or upper limiting value that depends on the actual value of the operating temperature variable. The specification of the lower or upper limiting value can take place with the control device in such a way that a temperature-caused viscosity change of the supplied cooling liquid is compensated. If, on the basis of the determined actual value of the operating temperature variable, the control device therefore suggests an increased viscosity of the cooling liquid, then it initiates a lowering of the upper limiting value or a raising of the lower limiting value to the effect that the increased shearing or friction forces in the air gap or the reduced lubricating capacity of the cooling liquid are taken into account. If, on the other hand, on the basis of the determined actual value of the operating temperature variable, the control device determines that the viscosity of the cooling liquid is lowered, then it induces a raising of the upper limiting value or a lowering of the lower limiting value, to the effect that the reduced shearing or friction forces in the air gap or the increased capacity of the cooling liquid are taken into account.

In addition, with the control device, a pre-control of the pressure or the volume flow of the supplied cooling liquid can take place in the sense of an adaptation to the expected cooling need of the motor generator unit. The expected cooling need is deduced by the control device on the basis of the actual operating state of the motor generator unit. The latter results from characteristic motor parameters, such as the motor rpm, the motor moment, or the motor performance. The characteristic motor parameters are made available to the control device with a motor control. The expected cooling need can be determined hereby from a loss model, located in the control device, which, for example, is mathematically depicted in a corresponding polynomial function or a look-up table. The pre-control permits the adaptation of the pressure or volume flow of the supplied cooling liquid, in an anticipatory and dynamic manner, to the cooling need that is expected as a result of the actual operating state, wherein an improved control of the actual value of the operating temperature variable is made possible.

Moreover, the control device may adapt the pressure or volume flow of the supplied cooling liquid during a generator operation of the electric motor generator unit in the sense of attaining an increased braking effect. In this way, a retarding function is implemented, for example, for the support of a braking operation carried out on a commercial agricultural vehicle by means of traditional wheel braking devices. To this end, the air gap can be flooded with cooling liquid by controlling the electrically operated valve or the electrically operated aperture, wherein maximum possible shearing and friction forces result between the rotor and the stator.

The adaptation of the pressure or the volume flow of the supplied cooling liquid can take place, in this case, in a manner independent of the determined actual value of the operating temperature variable. In other words, the pressure or the volume flow are fixed independently of the determined actual value of the operating temperature value, and thus a deviation that may exist, relative to the specified theoretical value. A variation is, however, conceivable as a function of the desired braking effect, for example, in accordance with a corresponding braking requirement of a vehicle operator.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
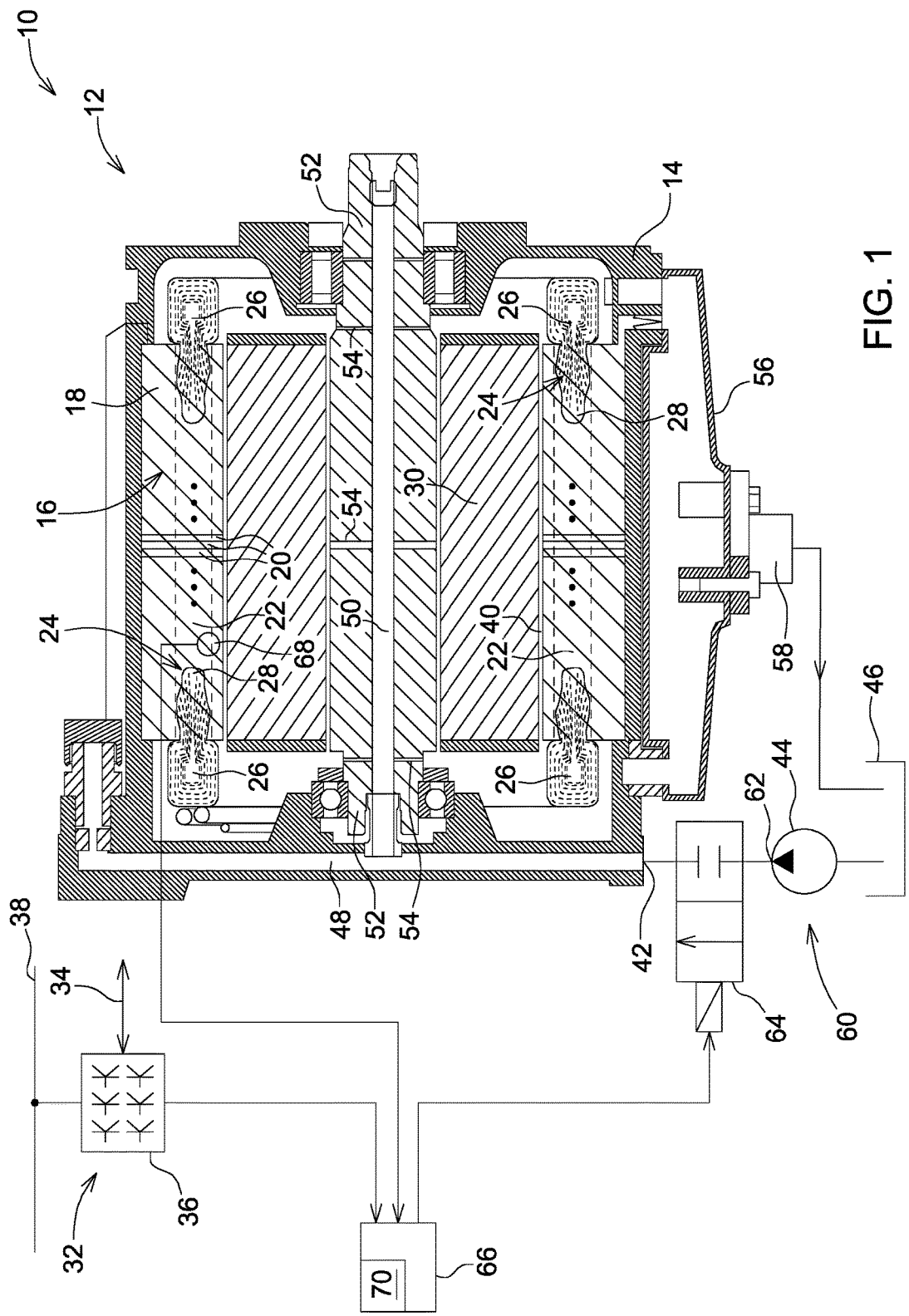
FIG. 1 is a partial cross-sectional view and system diagram of an arrangement for liquid cooling of an electric motor generator unit.

FIG. 1 shows an embodiment of a system in accordance with the present disclosure for the liquid cooling of an electric motor generator unit, which is a component of an infinitely switchable gear assembly of a non-depicted commercial agricultural vehicle.

The arrangement or system 10 includes an electric motor generator unit 12, wherein in the case under consideration, it is designed as an inner-cooled synchronous motor generator 14. The synchronous motor generator 14 has a stator 16 in the shape of a stator lamination package 18, made of highly permeable iron material. For the reduction of undesired eddy current losses, the stator lamination package 18 consists of a large number of stator laminations 20, axially lined up, only three of which are shown in FIG. 1 for reasons of clarity. The stator laminations 20, produced as automatic punching parts, have a thickness of between 0.5 to 5 mm.

Along an inner circumference of the stator lamination package 18, a number of axially running winding grooves 22 are provided. Each of the similarly designed winding grooves 22 is used to hold stator windings 24 that are produced from enameled copper wire. The stator windings 24 projecting on the front of the stator lamination package 18 form corresponding winding heads 26 on their ends. To avoid short circuits, the stator windings 24 are surrounded by a film-like groove insulation 28. The film-like groove insulation 28 is, for example, a Kapton film.

Moreover, the synchronous motor generator 14 includes a cylindrical rotor 30 that is mounted such that it can rotate within the stator lamination package 18. The rotor 30, formed of permanently magnetized material, can be made to rotate so as to carry out a motor operation under the effect of a magnetic alternating field, which can be produced with the stator windings 24. To this end, the stator windings 24 are provided by a motor control 32 with three-phase current 34 from a two-way inverter 36, which is supplied from a direct current circuit 38 of the commercial agricultural vehicle. Conversely, the synchronous motor generator 14 can also be used to carry out a generator operation, for which purpose the rotor 30 is made to rotate from the outside by means of a non-depicted drive device, for example, a combustion engine of the commercial agricultural vehicle. The three-phase current 34, thereby produced by the stator windings 24, is supplied to the two-way inverter 36 to supply the direct circuit 38 in the reverse direction.

The stator 16 and the rotor 30 are separated from one another by a magnetic air gap 40. The air gap 40 running between the stator 16 and the rotor 30 has a dimension of 0.3 to 0.5 mm.

In order to remove the dissipated heat appearing in the stator windings 24 and produced by the operation, the synchronous generator 14 has an inlet 42, via which cooling liquid, placed under pressure by means of a compressor 44 can be conducted from the outside from a reservoir 46 into a provision channel 48 of the synchronous motor generator 14. The cooling liquid passes through a central borehole 50 within the rotor 30 at radial boreholes 54, designed in the area of a corresponding rotor flange 52 or along the rotor 30. The cooling liquid, in the case of a rotating rotor 30, is flung in the direction of the winding heads 26 or the air gap 40 so as to cool the winding heads 26 or the stator lamination packet 18 bordering the air gap 40 and including the stator windings 24 running therein. The cooling liquid that flows away from the air gap 40 and from the winding heads 26 is collected in a bottom trough 56 of the synchronous generator 14 and is then returned, via a discharge conduit 58, to the reservoir 46.

The cooling liquid may be a hydraulic or gear oil, which is branched off from a central provisioning system 60 of the commercial agricultural vehicle and whose pressure is specified by the compressor 44 of the system.

For the implementation of a temperature-oriented supply of cooling liquid during the motor operation, which thus takes into consideration the actual cooling need of the synchronous motor generator 14, an electrically operated valve 64 is located between a high pressure outlet 62 of the compressor 44 and the inlet 42 of the synchronous motor generator 14. A control device 66 is used for the control of the electrically operated valve 64, as a function of a determined actual value $T_{actual}$ of an operating temperature variable of the synchronous motor generator 14. The determination of the actual value $T_{actual}$ of the operating temperature variable is carried out by means of a temperature sensor 68, located in the area of the air gap 40 in the stator lamination package 18. The temperature sensor signals are evaluated by the control device 66. The control device 66 adapts the pressure p and/or the volume flow Q of the supplied cooling liquid in accordance with the result of the evaluation of the sensor signals by a suitable control of the electrically operated valve 64.

Moreover, the electrically operated valve 64 is merely one of a large number of conceivable agents for the adaptation of the pressure p and/or the volume flow Q. Thus, alternatively, it can also be an electrically-operated aperture or the like.

Figure 2:
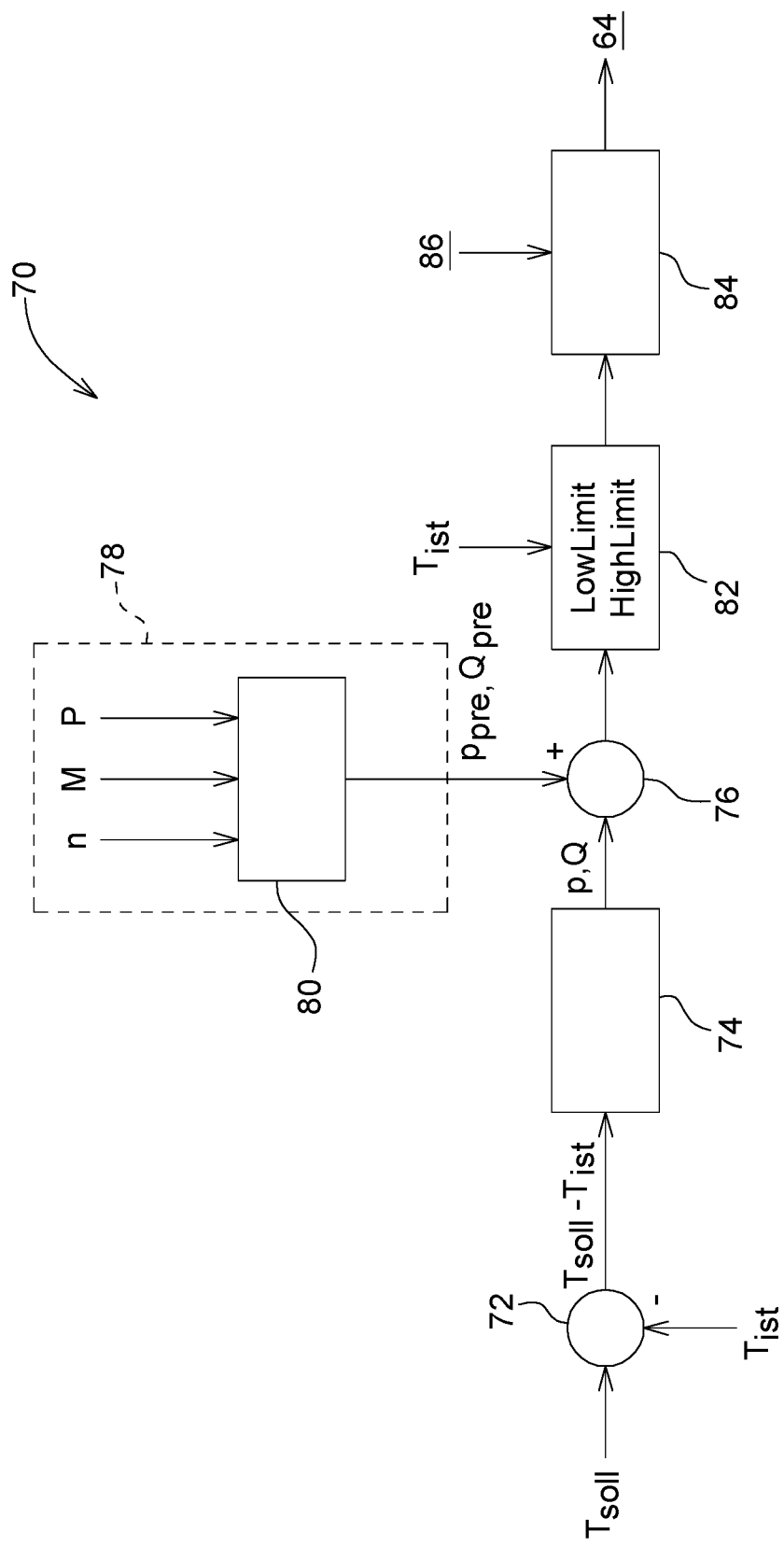
FIG. 2 is a block diagram of a control circuit including the arrangement of FIG. 1.
Figure 3:
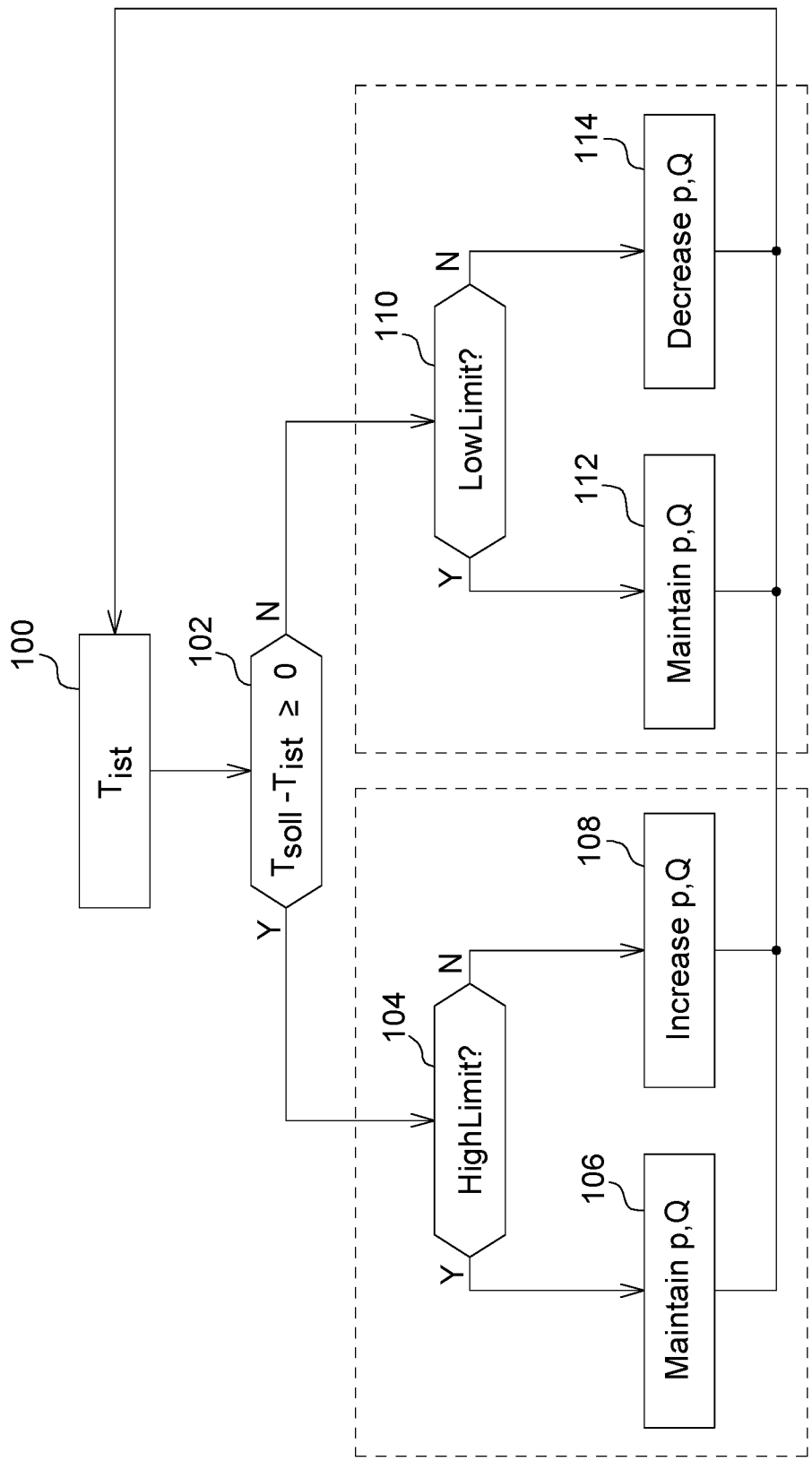
FIG. 3 is a flow chart of an operating mode of the arrangement of FIG. 1.

More precisely, the adaptation of the pressure p and/or the volume flow Q of the supplied cooling liquid takes place with the control device 66 in such a way that the determined actual value $T_{actual}$ is adapted to a theoretical value $T_{theoretical}$ of the operating temperature variable specified for the motor operation. With reference to FIGS. 2 and 3 of the present disclosure, the subscript "ist" refers to "actual" and "soll" refers to "theoretical". Thus, $T_{actual}$ and $T_{ist}$ are the same, whereas $T_{Theoretical}$ and $T_{soll}$ are the same.

With the corresponding specification of the theoretical operation of the synchronous motor generator 14, it is possible to ensure that only enough cooling liquid is conducted into the air gap 40 as is actually required for the cooling of the stator windings 24, measured on the actual operating state of the synchronous motor generator 14. The theoretical value $T_{theoretical}$ is hereby specified or predefined and results from the performance specifications of the individually used synchronous motor generator 14.

The adaptation of the actual value $T_{actual}$ to the theoretical value $T_{theoretical}$ of the operating temperature variable is carried out in the sense of a minimizing of a control deviation $T_{theoretical}$-$T_{actual}$ between the two values, and for this purpose, the control device 66 has a corresponding control circuit 70, as shown in FIG. 2.

The control circuit 70 shown in FIG. 2 undertakes, by means of a subtractor 72, a comparison between the actual value $T_{actual}$ and the theoretical value $T_{theoretical}$ of the operating temperature variable. A resulting control deviation $T_{theoretical}$-$T_{actual}$ is transmitted to a following control 74, which determines a pressure p and/or volume flow Q for the supplied cooling liquid included via the electrically operated valve 64. By means of an adder 76, a pre-control 78 of the included pressure p or volume flow Q also takes place by switching on a pre-control pressure $P_{pre}$ or a pre-control volume flow $Q_{pre}$ for adapting it in an anticipatory manner to the expected cooling need of the synchronous motor generator 14.

The expected cooling need is deduced by the control device 66 on the basis of the actual operating state of the synchronous motor generator 14. The latter results from characteristic motor parameters, in the case under consideration, the motor rpm "n", the motor moment "M", and the motor performance "P". The characteristic motor parameters are made available to the control device 66 by means of the motor control 32. The expected cooling need is determined from a loss model 80 located in the control device 66 which, for example, is depicted mathematically in a corresponding polynomial function or a look-up table.

The pre-control 78 makes it possible to adapt the pressure p or the volume flow V of the supplied cooling liquid in an anticipatory and dynamic manner to the cooling need of the synchronous motor generator 14 that is to be expected as a result of the actual operating state. An improved control of the actual value $T_{actual}$ of the operating temperature variable is therefore made possible.

Furthermore, the control device 66 limits, i.e., via an increase or decrease of, the included pressure p and/or volume flow Q of the supplied cooling liquid during the motor operation. To this end, the control device 66 specifies via a limiting device 82 a lower limiting value LowLimit, dependent on the actual value $T_{actual}$ of the operating temperature variable, or an upper limiting value HighLimit, in such a way that a temperature-induced viscosity change of the supplied cooling liquid is compensated. If, therefore, on the basis of the determined actual value $T_{actual}$ of the operating temperature variable the control device 66 suggests or commands an increased viscosity of the cooling liquid, then it initiates a lowering of the upper limiting value HighLimit, or a raising of the lower limiting value LowLimit, to the effect that the increased shearing or friction forces in the air gap 40 or the reduced lubricating capacity of the cooling liquid are taken into account. If, on the other hand, on the basis of the determined actual value $T_{actual}$ of the operating temperature variable the control device 66 determines that the viscosity of the cooling liquid is lowered, then it initiates a raising of the upper limiting value HighLimit or a lowering of the lower limiting value LowLimit to the effect that the reduced shearing or friction forces in the air gap 40 or the increased lubricating capacity of the cooling liquid are taken into account.

The further procedure depends on whether the synchronous motor generator 14 is found in the motor or the generator operation and whether the synchronous motor generator 14 is used in the generator operation for the implementation of a retarding function.

In the case of the motor operation, the control of the electrically operated valve 64 is carried out in the sense of an optimizing of the cooling performance-efficiency ratio of the synchronous motor generator 14 in accordance with the pre-controlled and possible limited pressure p or volume flow Q.

In another embodiment, if the synchronous motor generator 14 is used in the generator operation to implement a retarding function 84 such as to support a braking operation of the commercial agricultural vehicle carried out with traditional wheel braking devices, the control device 66 increases the included pressure p or the volume flow Q of the supplied cooling liquid to a maximum value provided for the attainment of an increased braking effect. For this purpose, the air gap 40 is flooded in accordance with a corresponding braking requirement 86 of a vehicle operator by controlling the electrically operated valve 64, wherein accordingly high shearing and friction forces result between the rotor 30 and the stator 16.

The adaptation of the included pressure p or volume flow Q of the supplied cooling liquid is carried out independently of the determined actual value $T_{actual}$ of the operating temperature variable. In other words, the pressure p or the volume flow Q are fixed independently of the determined actual value $T_{actual}$ of the operating temperature variable and thus of a deviation which possibly exists relative to the specified theoretical value $T_{theoretical}$.

In a further embodiment, the mode of functioning of the arrangement or system 10 is illustrated in FIG. 3 for the motor operation of the synchronous motor generator 14. The control procedure carried out by the control device 66 starts in a first step 100 with the determination of the actual value $T_{actual}$ of the operating temperature variable. This is compared in a subsequent second step 102 with the theoretical value $T_{theoretical}$ specified for the operating temperature variable. If, as a result of the comparison, it is clear that the actual value $T_{actual}$ is larger than the specified theoretical value $T_{theoretical}$, then, in a third step 104, the maintenance of the upper limiting value HighLimit specified for the included pressure p or volume flow Q is checked. If this is attained, then the actually included pressure p or volume flow Q is maintained unchanged in a fourth step 106, and the control procedure returns to the first step 100. If, on the other hand, the upper limiting value HighLimit is not attained, then the included pressure p or volume flow Q is increased in a fifth step 108 by a corresponding control of the electrically operated valve 64, in accordance with the controller 74 or the pre-control 78. Subsequently, the control procedure returns to the first step 100.

If, on the other hand, the result in the second step 102 is that the actual value $T_{actual}$ is smaller or equal to the specified theoretical value $T_{theoretical}$, then in a sixth step 110 the maintenance of the lower limiting value LowLimit specified for the included pressure p or the volume flow Q is also checked. If this is attained, then the actually included pressure p or volume flow Q is maintained unchanged in a seventh step 112, and the control procedure returns to the first step 100. If the lower limiting value LowLimit, on the other hand, is not attained, then the included pressure p or volume flow Q is lower in an eighth step 114 by a corresponding control of the electrically operated valve 64 in accordance with the controller 74 or the pre-control 78. Subsequently, the control procedure returns to the first step 100.

While embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A liquid cooling system, comprising:
an electric motor generator unit including a stator and a rotor;
an air gap for cooling the electric motor generator unit, the air gap defined between the stator and the rotor, where the air gap is configured to receive a cooling liquid supplied from a source located outside of the electric motor generator unit;
a temperature sensor for detecting an operating temperature variable; and
a control device operably controlling a pressure or flow of the supplied cooling liquid from the source as a function of a determined actual value of the operating temperature variable of the electric motor generator unit;
wherein the control device operably limits the flow of the supplied cooling liquid based on at least one of a lower and an upper limiting flow value, the at least one of the lower and the upper limiting flow value being based on the actual value of the operating temperature variable; and
wherein the control device operably determines, based on the actual value of the operating temperature variable, that the viscosity of the cooling liquid has changed, and the control device, in response, operably adjusts the at least one of the lower and the upper limiting flow value.

2. The system of claim 1, wherein the control device operably controls the pressure or flow of the supplied cooling liquid so the determined actual value is adapted to a theoretical value of the operating temperature variable specified for a motor operation of the motor generator unit.

3. The system of claim 1, wherein the control device operably executes pre-control of the pressure or flow of the supplied cooling liquid based on an expected cooling need of the motor generator unit.

4. The system of claim 1, wherein the control device operably adapts the pressure or flow of the supplied cooling liquid during a generator operation of the electric motor generator unit for attaining an increased braking effect.

5. The system of claim 4, wherein the adaptation of the pressure or flow of the supplied cooling liquid is carried out by the control device independently of the determined actual value of the operating temperature variable.

6. The system of claim 1, wherein the control device operably determines, based on the actual value of the operating temperature variable, that the viscosity of the cooling liquid has increased, and the control device, in response, operably lowers the upper limiting flow value, so as to compensate for the viscosity change.

7. The system of claim 1, wherein the control device operably determines, based on the actual value of the operating temperature variable, that the viscosity of the cooling liquid has increased, and the control device, in response, operably raises the lower limiting flow value, so as to compensate for the viscosity change.

8. The system of claim 1, wherein the control device operably determines, based on the actual value of the operating temperature variable, that the viscosity of the cooling liquid has decreased, and the control device, in response, operably raises the upper limiting flow value, so as to compensate for the viscosity change.

9. The system of claim 1, wherein the control device operably determines, based on the actual value of the operating temperature variable, that the viscosity of the cooling liquid has decreased, and the control device, in response, operably lowers the lower limiting flow value.

10. A liquid cooling system, comprising:
an electric motor generator unit including a stator and a rotor;
an air gap for cooling the electric motor generator unit, the air gap defined between the stator and the rotor, where the air gap is configured to receive a cooling liquid supplied from a source located outside of the electric motor generator unit;

a temperature sensor for detecting an operating temperature variable; and a control device operably controlling a pressure of the supplied cooling liquid from the source as a function of a determined actual value of the operating temperature variable of the electric motor generator unit;

wherein the control device operably limits the pressure of the supplied cooling liquid based on at least one of a lower and an upper limiting pressure value, the at least one of the lower and the upper limiting pressure value being based on the actual value of the operating temperature variable; and wherein the control device operably determines, based on the actual value of the operating temperature variable, that the viscosity of the cooling liquid has changed, and the control device, in response, operably adjusts the at least one of the lower and the upper limiting pressure value, so as to compensate for the viscosity change.

11. The system of claim 10, wherein the control device operably determines, based on the actual value of the operating temperature variable, that the viscosity of the cooling liquid has increased, and the control device, in response, operably lowers the upper limiting pressure value, so as to compensate for the viscosity change.

12. The system of claim 10, wherein the control device operably determines, based on the actual value of the operating temperature variable, that the viscosity of the cooling liquid has increased, and the control device, in response, operably raises the lower limiting pressure value, so as to compensate for the viscosity change.

13. The system of claim 10, wherein the control device operably determines, based on the actual value of the operating temperature variable, that the viscosity of the cooling liquid has decreased, and the control device, in response, operably raises the upper limiting pressure value, so as to compensate for the viscosity change.

14. The system of claim 10, wherein the control device operably determines, based on the actual value of the operating temperature variable, that the viscosity of the cooling liquid has decreased, and the control device, in response, operably lowers the lower limiting pressure value, so as to compensate for the viscosity change.

* * * * *